United States Patent
Kang et al.

(10) Patent No.: US 8,912,758 B2
(45) Date of Patent: Dec. 16, 2014

(54) POWER STORAGE APPARATUS, POWER STORAGE SYSTEM HAVING THE SAME AND METHOD OF ASSEMBLING POWER STORAGE SYSTEM BY USING THE SAME

(71) Applicant: LG Chem, Ltd., Seoul (KR)

(72) Inventors: Jung-Soo Kang, Daejeon (KR); Chan-Min Park, Daejeon (KR); Young-Bo Cho, Daejeon (KR); Jong-Soo Ha, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/889,380

(22) Filed: May 8, 2013

(65) Prior Publication Data

US 2013/0249475 A1    Sep. 26, 2013

Related U.S. Application Data

(63) Continuation of application No. PCT/KR2012/004263, filed on May 30, 2012.

(30) Foreign Application Priority Data

May 31, 2011 (KR) .................. 10-2011-0051803
May 30, 2012 (KR) .................. 10-2012-0057215

(51) Int. Cl.
*H02J 7/00* (2006.01)
*H04Q 9/00* (2006.01)
*H01M 10/42* (2006.01)
*G01R 31/36* (2006.01)

(52) U.S. Cl.
CPC ............... *H02J 7/0042* (2013.01); *H04Q 9/00* (2013.01); *H01M 10/4207* (2013.01); *H02J 7/0009* (2013.01); *H02J 7/0013* (2013.01); *H02J 7/00* (2013.01); *G01R 31/3686* (2013.01); *H04Q 2209/88* (2013.01); *H01M 2010/4271* (2013.01); *H02J 7/0004* (2013.01); *H02J 7/0026* (2013.01)
USPC ............ 320/120; 320/116; 320/121; 320/122

(58) Field of Classification Search
CPC ........................................ Y02E 60/12
USPC ................................. 320/112, 120
See application file for complete search history.

(56) References Cited

U.S. PATENT DOCUMENTS 6,641,951 B1 * 11/2003 Vutetakis et al. ............. 429/100
7,019,488 B2    3/2006 Nakao
(Continued)

FOREIGN PATENT DOCUMENTS

JP    2003-174738 A    6/2003
JP    2009-513095 A    3/2009
(Continued)

OTHER PUBLICATIONS

International Search Report issued in PCT/KR2012/004263, mailed on Nov. 30, 2012.
Written Opinion of the International Searching Authority issued in PCT/KR2012/004263, mailed on Nov. 30, 2012.

\* cited by examiner

*Primary Examiner* — Edward Tso
*Assistant Examiner* — Ahmed Omar
(74) *Attorney, Agent, or Firm* — Birch, Stewart, Kolasch & Birch, LLP (57) ABSTRACT

The present disclosure describes a power storage apparatus including a housing made of a durable material and defining an installation space of a plurality of secondary batteries; a plurality of secondary batteries accommodated in the housing and connected to each other in series or in parallel; a Battery Management System (BMS) for controlling charge and discharge of the plurality of secondary batteries and monitoring an electric characteristic value thereof; and a status setting switch for setting a status of the BMS. According to the present disclosure, a power storage system may be easily configured by means of a simple BMS setting. Also, if any one of the power storage apparatuses is not working properly, the power storage apparatus with a problem may be easily distinguished by the naked eyes of a manager, which facilitates easy maintenance and repair.

20 Claims, 6 Drawing Sheets

(56) References Cited

U.S. PATENT DOCUMENTS

| | | |
|---|---|---|
| 7,135,836 B2 * | 11/2006 | Kutkut et al. ............ 320/116 |
| 7,453,236 B2 | 11/2008 | Eguchi et al. |
| 2010/0295382 A1 * | 11/2010 | Tae et al. ............ 307/150 |
| 2011/0175574 A1 | 7/2011 | Sim et al. |
| 2012/0228946 A1 * | 9/2012 | Sim et al. ............ 307/80 |
| 2012/0321934 A1 * | 12/2012 | Hopkins et al. ............ 429/151 |

FOREIGN PATENT DOCUMENTS

| | | |
|---|---|---|
| KR | 10-0771652 B1 | 10/2007 |
| KR | 10-0826096 B1 | 4/2008 |
| KR | 10-2010-0097504 A | 9/2010 |
| KR | 10-2011-0013747 A | 2/2011 |

POWER STORAGE APPARATUS, POWER STORAGE SYSTEM HAVING THE SAME AND METHOD OF ASSEMBLING POWER STORAGE SYSTEM BY USING THE SAME

CROSS-REFERENCE TO RELATED APPLICATION

The present application is a continuation of International Application No. PCT/KR2012/004263 filed on May 30, 2012, which claims priority to Korean Patent Application No. 10-2012-0057215 filed in the Republic of Korea on May 30, 2012 and Korean Patent Application No. 10-2011-0051803 filed in the Republic of Korea on May 31, 2011, the disclosures of which are incorporated herein by reference.

TECHNICAL FIELD

The present disclosure relates to a power storage apparatus, a power storage system having the same, and a method of assembling a power storage system by using the same, and more particularly, to a power storage apparatus which may easily set a master or slave status, a power storage system having the same, and a method of assembling a power storage system by using the same.

BACKGROUND ART

A secondary battery has high applicability depending on the product group and excellent electric characteristics such as high energy density, and thus not only commonly applied to mobile devices, but also electric vehicles (EV), hybrid electric vehicles (HEV) or the like, as an electric power source. Such a secondary battery significantly reduces the use of the fossil fuels and does not generate by-products caused by the use of energy. Therefore, secondary batteries are drawing attention as an eco-friendly alternative energy source with improved energy efficiency.

A secondary battery includes a cathode current collector, an anode current collector, a separator, an active material, a liquid electrolyte, etc., and has a chargeable and dischargeable structure due to the electro-chemical reaction among the components. Meanwhile, since recently a secondary battery is frequently used as an energy storing source and the need of a battery structure having a large capacity is increasing, a secondary battery pack with a multi-module structure having a plurality of the secondary batteries connected to each other in series or in parallel is commonly used.

A secondary battery pack includes secondary battery modules having a plurality of secondary battery cells aggregated therein and a pack case. In addition to this fundamental structure, a secondary battery pack further includes a Battery Management System (BMS) for monitoring and controlling the status of secondary battery cells or secondary battery modules by applying an algorithm for controlling power supply to a load, measuring an electric characteristic value such as current, voltage or the like, controlling charge and discharge, controlling equalization of voltage, estimating State Of Charge (SOC), etc.

Meanwhile, in order to meet various voltage and capacity requirements, a power storage system may be configured by assembling small-capacity power storage unit racks, each having a plurality of secondary battery packs as described above, in series or in parallel.

In order to operate the power storage system, voltage, current, temperature, SOC, or the like of each power storage unit rack should be continuously monitored. For monitoring the status of each power storage unit rack and efficiently controlling the unit rack, correlations of BMSs included in the power storage unit racks are set, so that one of the BMSs included in the power storage unit racks is set to a master BMS and the rest of the BMSs are set to slave BMS. In addition, the master BMS controls the slave BMSs to integrally operate and control the power storage system.

Recently, with smart grids being at the center of interest, the need for a large-capacity power storage system storing unused power is increasing to implement an intelligent power grid. In order to construct such a large-capacity power storage system, a plurality of power storage unit racks is required and the time and cost proportional to the capacity of the system is demanded for installation and management thereof. Therefore, there is a need to develop a technology capable of easily setting a master BMS and a slave BMS in a power storage apparatus such as the power storage unit racks described above.

DISCLOSURE

Technical Problem

The present disclosure is designed to solve the problems of the prior art, and therefore it is an object of the present disclosure to provide a power storage apparatus which may easily set a master or a slave, a power storage system having the same and a method of assembling a power storage system by using the same.

Technical Solution

In order to accomplish the above object, the present disclosure provides a power storage apparatus, including a housing made of a durable material and defining an installation space of a plurality of secondary batteries; a plurality of secondary batteries accommodated in the housing and connected to each other in series or in parallel; a battery management system (BMS) for controlling charge and discharge of the plurality of secondary batteries and monitoring an electric characteristic value thereof; and a status setting switch for setting a status of the BMS.

According to the present disclosure, the status setting switch may set the BMS to have a master status or a slave status. Herein, the status setting switch may set the BMS to have a master status or an $n^{th}$ slave status.

According to an embodiment of the present disclosure, the BMS may allocate a value set in the status setting switch as a communication identifier thereof.

According to an embodiment of the present disclosure, the status setting switch may be a jumper switch or a Dual In-line Package (DIP) switch.

The power storage apparatus according to the present disclosure may further include a group setting switch for setting a BMS group. Herein, the BMS may allocate values set in the status setting switch and the group setting switch as communication identifiers thereof.

In accordance with an embodiment of the present disclosure, the group setting switch may be a jumper switch or a DIP switch.

The power storage apparatus according to the present disclosure may further include a power line connection terminal and a communication line connection terminal.

The power storage apparatus according to the present disclosure may be a part of components of a power storage system having a plurality of power storage apparatuses.

The power storage system according to the present disclosure may further include a power inverter connected to one end of a power line connecting the plurality of power storage apparatuses to each other.

The power storage system according to the present disclosure may further include an external communication line for connecting a power storage apparatus having a BMS, set to have a master BMS status in the power storage system, to an external monitoring apparatus.

In order to accomplish the object according to the present disclosure, there is provided a method of assembling a power storage system by using a power storage apparatus having a BMS and a status setting switch for setting a status of the BMS, including (a) arranging at least two power storage apparatuses; (b) setting a status of a BMS included in each power storage apparatus by using a status setting switch included in the corresponding power storage apparatus; and (c) connecting power lines and communication lines of the plurality of power storage apparatuses.

Advantageous Effects

According to an aspect of the present disclosure, a power storage system may be easily configured by means of a simple BMS setting. Also, if any one of power storage apparatuses is not working properly, the power storage apparatus with a problem may be easily distinguished by the naked eyes of a manager, which facilitates easy maintenance and repair.

In accordance with another aspect of the present disclosure, in the case that status or group information set in each BMS is used as a BMS communication identifier of each corresponding BMS, a power storage apparatus may be simply fabricated, since it is unnecessary to store a communication identifier separately or use a separate identifier allocating algorithm.

In accordance with another aspect of the present disclosure, it is not necessary to configure separate power storage apparatuses for a master BMS and a slave BMS. Therefore, the cost required for fabricating power storage apparatuses may be reduced, and the power storage apparatuses may be installed and maintained without having to distinguish a master power storage apparatus and a slave power storage apparatus. Furthermore, if a power storage apparatus breaks down, the apparatus may be easily replaced, which facilitates easy maintenance and repair of a power storage system.

DESCRIPTION OF DRAWINGS

Other objects and aspects of the present disclosure will become apparent from the following descriptions of the embodiments with reference to the accompanying drawings in which.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
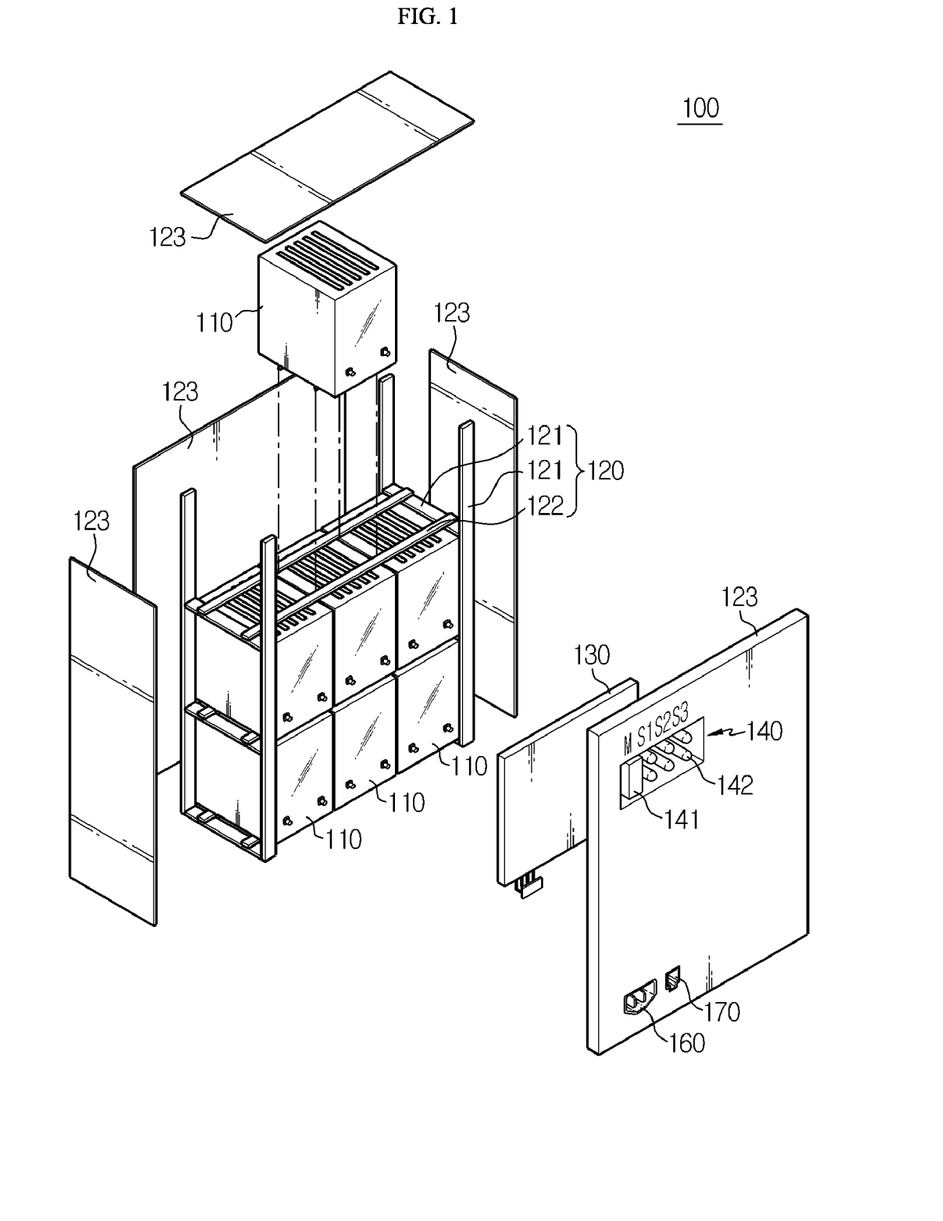
FIG. 1 is an exploded perspective view showing a secondary battery rack according to an embodiment of the present disclosure.

FIG. 1 is an exploded perspective view showing a secondary battery rack 100 according to an embodiment of the present disclosure.

A power storage apparatus according to the present disclosure may have various capacities or sizes. If a secondary battery pack having a plurality of secondary battery modules is selected as a unit device of a power storage system, the secondary battery pack may be a power storage apparatus according to the present disclosure. Also, if a secondary battery rack having a plurality of secondary battery packs is selected as a unit device of a power storage system, the secondary battery rack may be a power storage apparatus according to the present disclosure. The secondary battery rack 100 of FIG. 1 is used as a power storage apparatus corresponding to a unit device of a power storage system, and should be understood just as an embodiment of the present disclosure.

Referring to FIG. 1, the secondary battery rack 100 according to an embodiment of the present disclosure includes secondary battery packs 110, a rack housing 120, a Battery Management System (BMS) 130 and a status setting switch 140.

The plurality of secondary battery packs 110 is accommodated in the rack housing 120 and connected to each other in series or in parallel. The secondary battery packs 110 may be connected to each other in various ways based on required output voltage or power capacity. The secondary battery pack 110 includes one or more secondary battery cells, and the type of the secondary battery cells is not specifically limited. The secondary battery cells may be configured with rechargeable lithium-ion batteries, lithium polymer batteries, nickel-cadmium batteries, nickel-hydride batteries, nickel-zinc batteries, or the like.

The rack housing 120 is made of a durable material and defines an installation space for the plurality of secondary battery packs 110. For example, the rack housing 120 is made of metal. The rack housing 120 includes a rack assembly 121 configured in the form capable of limiting the entire accommodation area, where the plurality of secondary batteries 110 are accommodated in multi-stage form. The rack housing 120 also includes a plurality of rail frames 122 disposed in pairs at multi stages and coupled to the rack assembly 121 so as to support the bottom surfaces of the lower portion of the secondary battery packs 110. Also, the rack housing 120 may further include a housing cover 123. The rack housing 120 is just an embodiment of the secondary battery rack 100 according to the present disclosure, and the structure and material of the rack housing 120 may be variously modified.

The BMS 130 optionally includes functions of measuring an electric characteristic value such as a current or voltage of the secondary battery pack 110, controlling charge and discharge, controlling voltage equalization, estimating state of charge (SOC), controlling power supply to a load of the secondary battery rack 100, monitoring, signing an error, controlling on/off, or the like, and may perform various control logics applicable by those skilled in the art. Also, if the secondary battery rack 100 is used as a unit device to configure a secondary battery system, the BMS 130 may send and receive data to and from a BMS of an adjacent secondary battery rack through a communication line. Particularly, if a status of each BMS included in each secondary battery rack of the power storage system is set to have either a master status or a slave status, each BMS may perform control logics based on the set status thereof.

The status setting switch 140 is used for setting a status of the BMS 130. Setting a BMS status indicates that, in a power storage system having a plurality of secondary battery racks 100, a BMS included in one of the secondary battery racks is set to a master BMS, and BMSs included in the rest of the secondary battery racks are set to slave BMSs.

In the embodiment of FIG. 1, the status setting switch 140 is a jumper switch. The jumper switch electrically recognizes a coupling and uncoupling pattern of a coupling member 141. The jumper switch includes a plurality of jumper pins 142. The jumper switch provides identification information corresponding to a jumper pin 142 coupled to a coupling member 141 among a plurality of jumper pins 142. The jumper switch is widely known in the art, and thus it will not be described in detail here.

The jumper switch of FIG. 1 includes eight jumper pins 142 in total. That is, the jumper switch includes four pairs of jumper pins in total so that jumper pins corresponding to each other in the vertical direction are paired. The pairs of jumper pins include a pair of master jumper pins M, a pair of first slave jumper pins S1, a pair of second slave jumper pins S2 and a pair of third slave jumper pins S3, which respectively represent status information of a BMS. If a coupling member 141 is coupled to one of the four pairs of jumper pins, a status of a BMS corresponding to the coupled pair of jumper pins is set.

In the embodiment of FIG. 1, the coupling member 141 is coupled to the master jumper pins M. Therefore, it may be confirmed that the BMS 130 of the secondary battery rack is set to a master BMS. However, if the coupling member 141 is coupled to any one pair of jumper pins among the slave pins S1 to S3, the BMS 130 of the secondary battery rack may be set to a slave BMS, different from the above.

If the status setting switch 140 is configured with a jumper switch, the BMS 130 may be electrically coupled to the jumper switch to identify the BMS status information set in the jumper switch. To achieve this, the BMS 130 may include a connector electrically coupled to the jumper switch. Meanwhile, depending on circumstances, when the BMS 130 is electrically coupled to the jumper switch, the jumper switch may actively output BMS status information to the BMS 130.

According to another embodiment of the present disclosure, since the status setting switch 140 includes the plurality of slave jumper pins 142, if the BMS 130 is set to a slave BMS, the order of the slave BMSs may also be set based on the position of the slave jumper pins.

According to another aspect of the present disclosure, the BMS 130 may allocate a value set in the status setting switch 140 as a communication identifier thereof. In a power storage system, each BMS may send and receive data to and from another BMS connected thereto through a communication line. At this time, each BMS has an identifier for indentifying itself over the communication line. In addition, the identifier must not be duplicated. A value set in the status setting switch 140 is a master or an $n^{th}$ slave with no duplication. Therefore, each BMS 130 may allocate the value set in the status setting switch 140 as a communication identifier thereof and use the value as an identifier over the communication line. In this case, it is unnecessary to allocate a communication identifier to the BMS 130 in advance. Also, an algorithm for allocating a communication identifier is not separately required. Therefore, the BMS 130 may be simply fabricated, maintained and repaired.

Meanwhile, as required capacity or output of a power storage system increases, more power storage apparatuses are required. However, if a power storage system operates in a way that a single master BMS controls all slave BMSs, as the number of power storage apparatuses increases, the amount of data which have to be processed by the master BMS becomes too large to be efficiently controlled. Therefore, it is more efficient to divide the plurality of power storage apparatuses into two or more groups, set a master BMS and slave BMSs in each group, and control the plurality of power storage apparatuses in each group. Accordingly, the secondary battery rack 100 may further include a group setting switch capable of setting a group of the BMSs 130 optionally.

Figure 2:
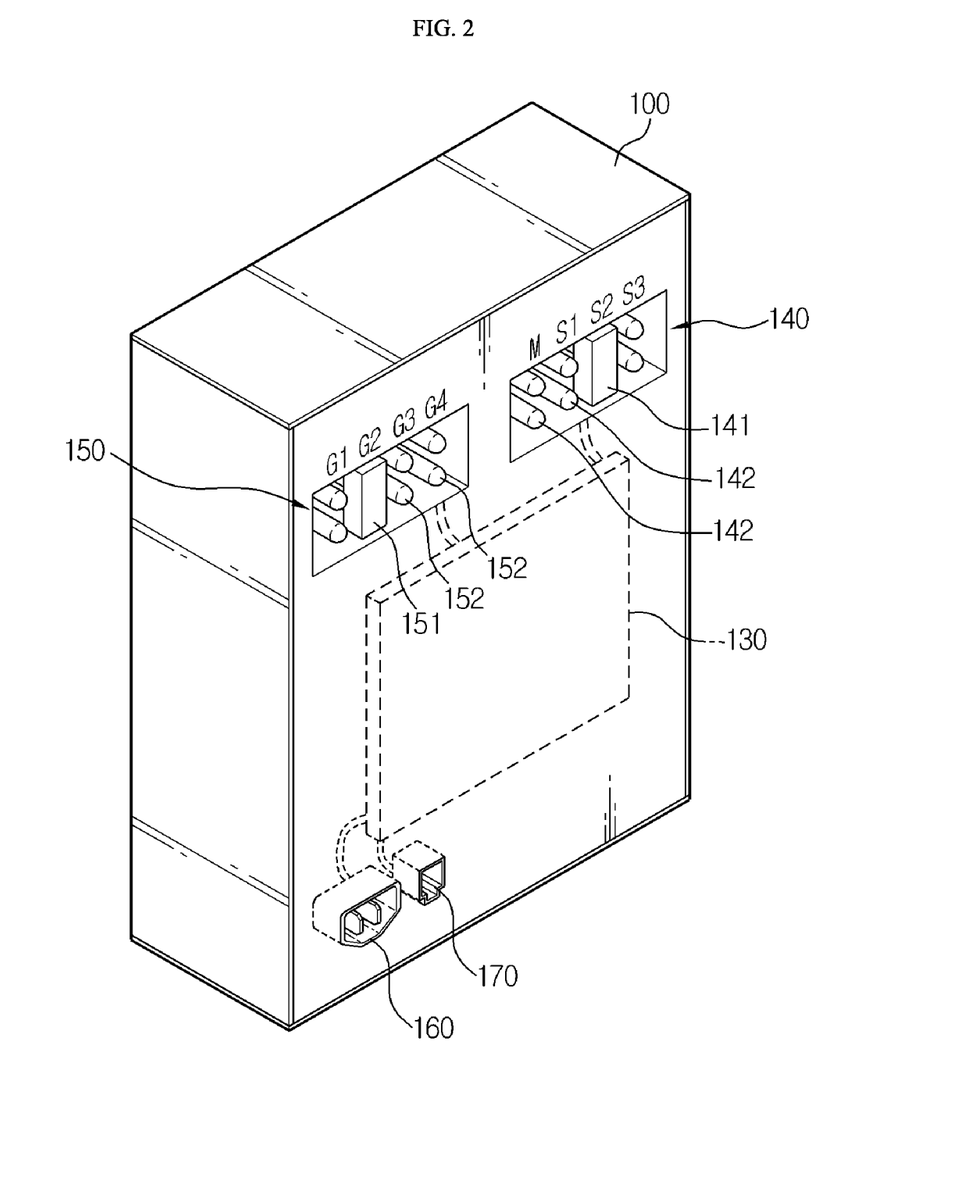
FIG. 2 is a perspective view showing another embodiment of a secondary battery rack having a status setting switch and a group setting switch together.

FIG. 2 is a perspective view showing another embodiment of a secondary battery rack 100 having a status setting switch 140 and a group setting switch 150 together.

Referring to FIG. 2, the secondary battery rack 100 according to another embodiment of the present disclosure includes the status setting switch 140 and the group setting switch 150 together. For example, the status setting switch 140 and the group setting switch 150 may be configured with jumper switches and respectively installed in the left and right sides of a front housing cover of the secondary battery rack 100. The group setting switch 150 sets a group of the BMS 130 based on the position of a jumper pin 152 coupled to a coupling member 151, similar to the status setting switch 140.

In the group setting switch 150 shown in FIG. 2, a coupling member 151 is coupled to a second group pin G2, and in the status setting switch 140, a coupling member 141 is coupled to a second slave pin S2. Therefore, it may be understood that the status of the BMS 130 included in the secondary battery rack 100 is set to a second slave BMS in a second group.

If the group setting switch 150 is configured with a jumper switch, the BMS 130 may be electronically coupled to the jumper switch to identify BMS group information set in the jumper switch. To achieve this, the BMS 130 may include a connector electronically coupled to the group setting switch 150 configured with a jumper switch. Meanwhile, depending on circumstances, when the BMS 130 is electronically coupled to the group setting switch 150, the group setting switch 150 may actively output BMS group information to the BMS 130.

The BMS 130 may allocate values set in the status setting switch 140 and the group setting switch 150 as its inherent communication identifiers and communicate with another BMS to send and receive data, similar to the former case.

According to another embodiment of the present disclosure, the status setting switch 140 or the group setting switch 150 may be implemented as a Dual In-line Package (DIP) switch.

Figure 3:
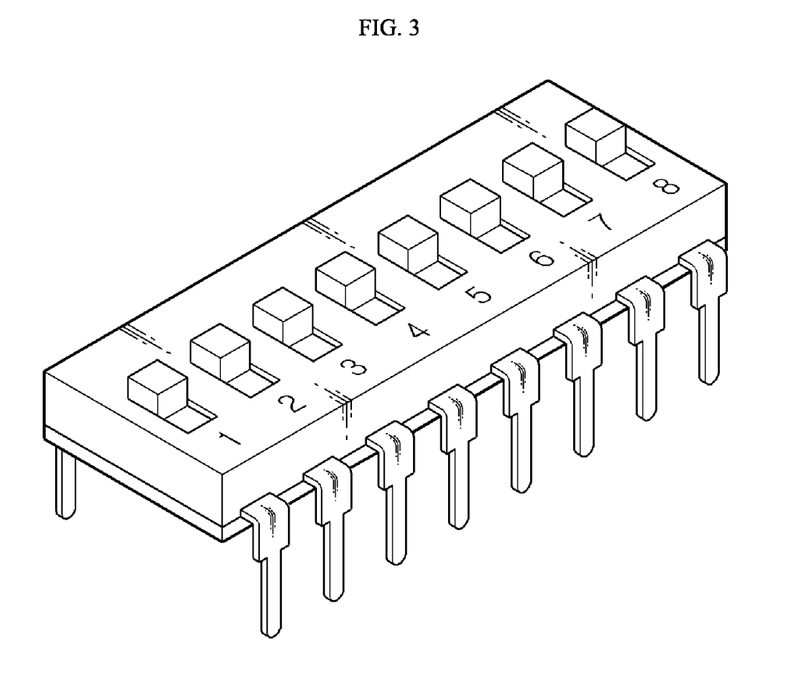
FIG. 3 is a diagram showing a Dual In-line Package (DIP) switch which may be used as the status setting switch or the group setting switch.

FIG. 3 is a diagram showing a Dual In-line Package (DIP) switch which may be used as the status setting switch or the group setting switch.

The DIP switch of FIG. 3 may input $2^8$ number of information. Therefore, a maximum of 256 groups or statuses may be set with no duplication. The size and the number of the DIP switch are variable depending on capacity of the power storage system, or the like.

If the status setting switch 140 or the group setting switch 150 is configured with a DIP switch, the BMS 130 may be electrically coupled to the DIP switch to identify BMS status information or BMS group information set in the DIP switch. To achieve this, the BMS 130 may include a connector electrically coupled to the DIP switch. Meanwhile, depending on circumstances, when the BMS 130 is electrically coupled to the DIP switch, the DIP switch may actively output BMS status information and BMS group information to the BMS 130.

The power storage apparatus according to the present disclosure may further include a power line connection terminal capable of connecting a power line, and a communication line connection terminal capable of connecting a communication line.

The secondary battery rack 100 of FIGS. 1 and 2 may further include a power line connection terminal 160 and a communication line connection terminal 170, for example, installed at the lower end of the front housing cover.

The power line communication terminal 160 may be used to connect the secondary battery rack 100 with an adjacent secondary battery rack in series or in parallel, or both. The power line connection terminal 160 has a structure having a high electrical potential terminal and a low electrical potential terminal coupled to a single plug, but the present disclosure is not limited thereto.

The BMS 130 may communicate with an adjacent secondary battery rack connected through the communication line connection terminal 170. For the communication, various known methods including CAN communication, daisy-chain communication or the like, may be used. The shape and the number of the communication line connection terminal 170 may vary depending on the communication type of the power storage apparatus according to the present disclosure. Therefore, the structure of the communication line connection terminal 170 is not limited to the present disclosure.

In order to perform various control logics described above, the BMS 130 may include a processor, an Application-Specific Integrated Circuit (ASIC), a different chipset, a logic circuit, a register, a communication modem, a data processing device or the like, widely known to those skilled in the art. Also, if the control logics described above are implemented as software, the BMS 130 may be implemented as an aggregation of program modules. The program modules may be stored in a memory and performed by a processor. Here, the memory may be provided at the inside or outside of the processor, and connected to the processor by various known means.

The power storage apparatus according to the present disclosure may be a component of a power storage system including a plurality of power storage apparatuses.

Figure 4:
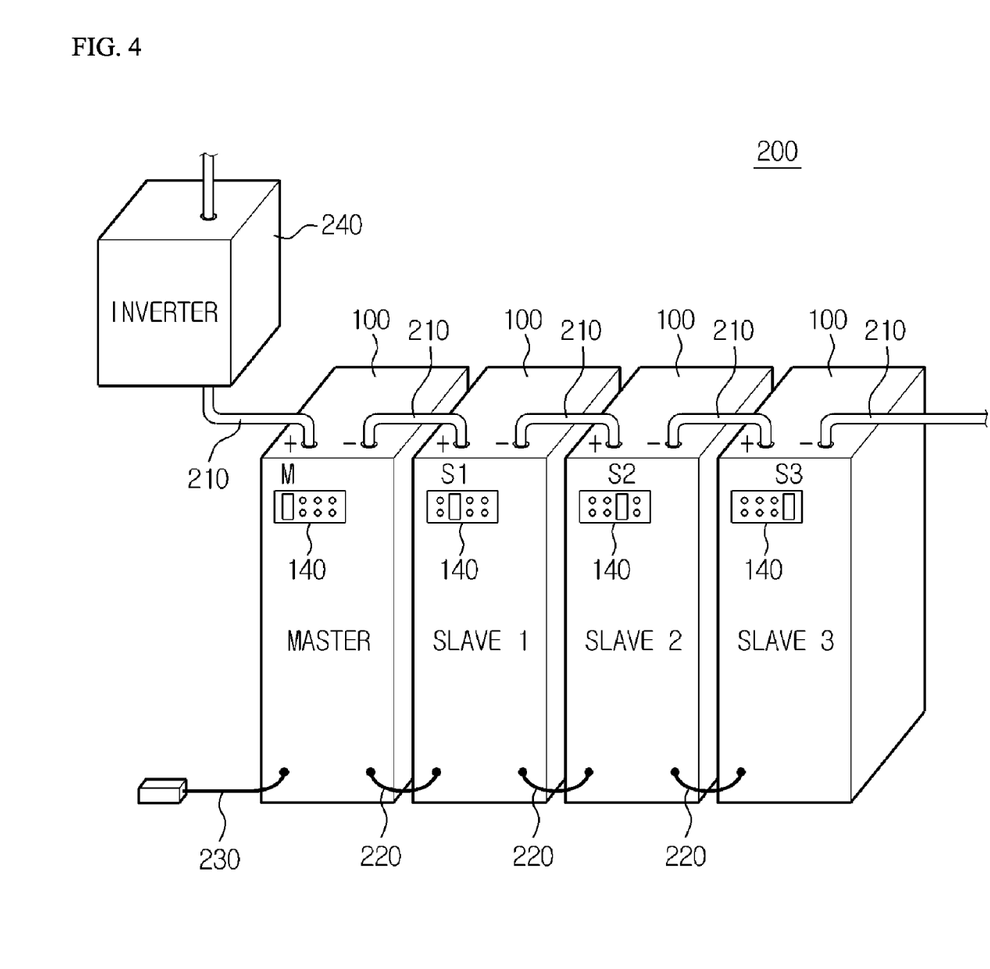
FIG. 4 is a diagram showing a power storage system, where the power storage apparatuses according to the present disclosure are connected to each other in series.

FIG. 4 is a diagram showing a power storage system, where power storage apparatuses according to the present disclosure are connected to each other in series.

Referring to FIG. 4, a power storage system 200 includes the aforementioned secondary battery racks 100 as unit devices therein. The plurality of secondary battery racks 100 are set to a master (MASTER) and first to third slaves (SLAVE 1, 2, and 3), respectively, by using the status setting switch 140. The secondary battery racks 100 are connected in series through the power line 210. The secondary battery racks 100 are connected to each other through the communication line 220 for intercommunication. The communication line of FIG. 4 is a serial communication network which may be a daisy-chain. The daisy-chain is widely known in the art and thus not described in detail here.

The power storage system 200 according to the present disclosure may further include an external communication line 230 for connecting the power storage apparatus having a master BMS, to an external monitoring device. The external monitoring device may be a device which displays the status of the power storage system 200 to a user or manager and transmits a control signal inputted by the user or manager to the master BMS.

The power storage system 200 according to the present disclosure may further include a power inverter 240 connected to one end of the power line which connects a plurality of power storage apparatuses to each other. The power inverter 240 may convert commercial AC current of a grid system to DC current having a predetermined voltage level and apply the DC current to the power storage apparatus. On the contrary, the power inverter 240 may convert DC current outputted from the power storage apparatus to AC current having a predetermined voltage level and apply the AC current to the grid system. FIG. 4 illustrates an embodiment in which the secondary battery rack (MASTER), set to have a master status, is connected to the power inverter 240, but the present disclosure is not limited thereto.

Figure 5:
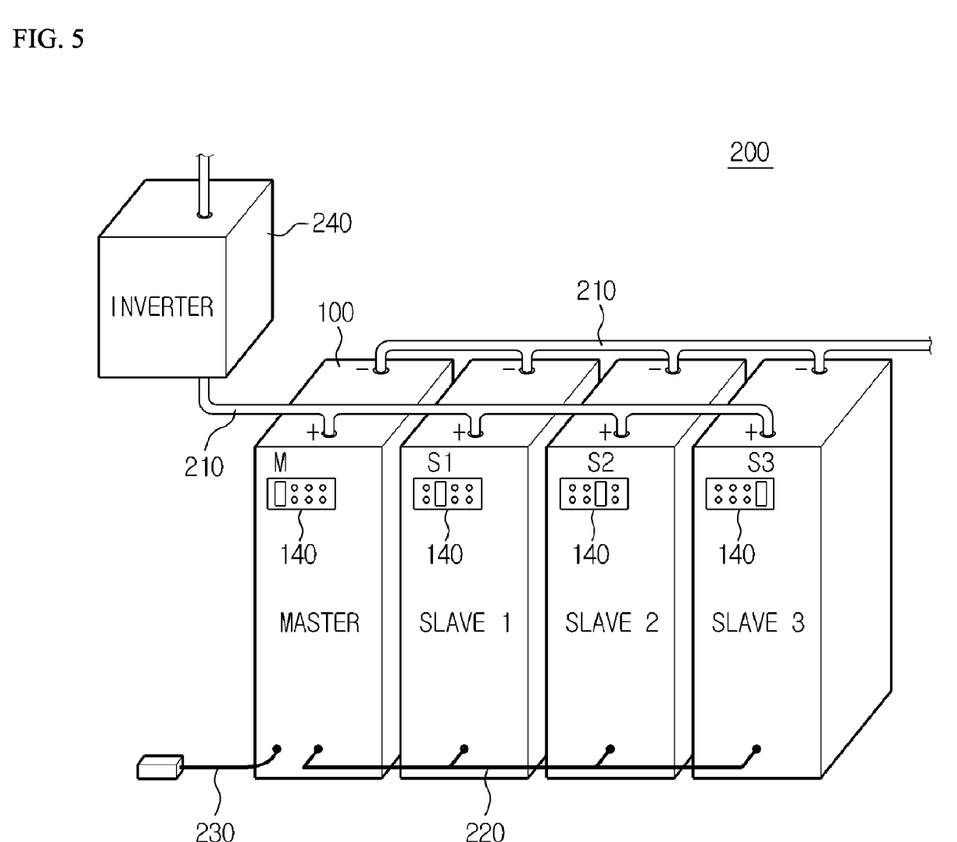
FIG. 5 is a diagram showing a power storage system, where the power storage apparatuses according to the present disclosure are connected to each other in parallel.

FIG. 5 is a diagram showing a power storage system, where the power storage apparatuses according to the present disclosure are connected to each other in parallel.

All components of the power storage system 200 of FIG. 5 are substantially identical to those of the power storage system of FIG. 4, except that the second battery racks 100 are connected to each other in parallel, and a communication line 220 thereof is a parallel communication line. The communication line may be a Controller Area Network (CAN) communication network. The CAN communication network is widely known in the art and thus will not be described in detail here.

The power storage system 200 of FIGS. 4 and 5 according to the present disclosure is just an embodiment. The power storage apparatus may be a secondary battery pack instead of the secondary battery rack 100. Also, connection type of the power line 210 may be in series or in parallel or both according to demanded capacity of output power of a power storage system, as being obvious in the art. In addition, it is obvious to those skilled in the art that the communication line may have various connection and communication types. Therefore, the power storage system 200 of FIGS. 4 and 5 is just an embodiment of a power storage system according to the present disclosure, and the scope of the present disclosure is not limited thereto.

Hereinafter, a method of assembling the power storage system 200 by using the aforementioned power storage apparatus will be described. Duplicated explanation about configuration of the power storage apparatus described above will not be provided in detail here.

Figure 6:
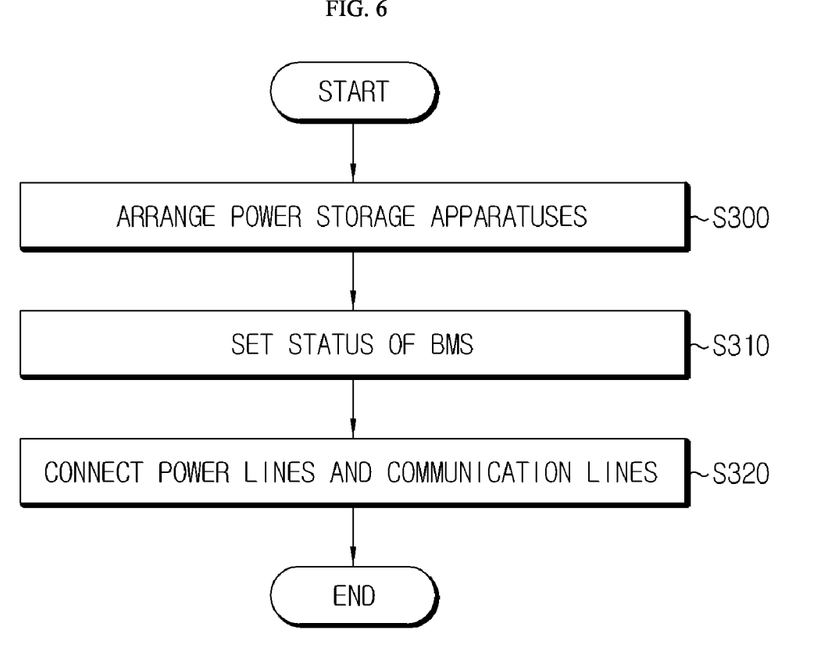
FIG. 6 is a flowchart for illustrating a method of assembling a power storage system according to an embodiment of the present disclosure.

FIG. 6 is a flowchart for illustrating a method of assembling a power storage system according to an embodiment of the present disclosure.

In step S300, power storage apparatuses are arranged. It has already been described that power storage apparatuses may have various types such as a secondary battery pack, a secondary battery rack or the like according to the form of a unit device of the power storage system 200. Also, regarding the arrangement of power storage apparatuses, the specification or the number of power supply apparatuses is determined according to the capacity or output power required for the power storage system 200. However, for explanatory convenience, the secondary battery rack 100 of FIGS. 1 to 5 is considered a unit device of the power storage system 200 in the following explanation.

Next, in step S310, a status of each BMS 130 is set by means of the status setting switch 140 of each power storage apparatus. In this step, a status of each BMS is set to a master status or a slave status by means of the status setting switch 140. Here, the setting of slave BMSs may include setting the order of the slave BMS.

The method of assembling a power storage system according to the present disclosure may further include allowing the BMS 130 to allocate a value set in the status setting switch 140 as a communication identifier thereof.

If the power storage apparatus includes the group setting switch 150, the method of assembling a power storage system according to the present disclosure further includes setting each BMS group by means of the group setting switch 150. In this case, the method of assembling a power storage system according to the present disclosure may further include allowing the BMS 130 to allocate values set in the status setting switch 140 and the group setting switch 150 as communication identifiers thereof.

The steps of setting a status of each BMS and a BMS group and allocating the values set in the status setting switch 140 and the group setting switch 150 as BMS communication identifiers have been described above and thus will not described in detail here.

Finally, in step S320, the power lines 210 and the communication lines 220 of the power storage apparatuses are connected. In this step, the power storage apparatuses may be connected to each other in series or in parallel, or both by means of the power lines 210 according to the capacity or output power required for the power storage system 200.

If the power storage system 200 includes a power inverter 240, the method of assembling a power storage system according to the present disclosure may further include connecting the power inverter 240 to one end of a power line which connects the plurality of the power storage apparatuses to each other.

The method of assembling a power storage system according to the present disclosure may further include connecting a power storage apparatus having a master BMS in the power storage system to an external monitoring apparatus through an external communication line.

The connection of the power lines or communication lines of the power storage apparatuses has already been described above and thus will not be described in detail here.

According to the present disclosure, a power storage system may be easily configured by means of simple BMS setting. Also, if any one of the power storage apparatuses is not working properly, the power storage apparatus with a problem may be easily distinguished by the naked eyes of a manager, which facilitates easy maintenance and repair. In addition, in the case that status or group information set in each BMS is used as a BMS communication identifier of each corresponding BMS, a power storage apparatus may be simply fabricated since it is unnecessary to store a communication identifier separately or use a separate identifier allocating algorithm. Further, it is not necessary to configure separate power storage apparatuses for a master BMS and a slave BMS. Therefore, the cost required for fabricating power storage apparatuses may be reduced, and the power storage apparatuses may be installed and maintained without having to distinguish a master power storage apparatus and a slave power storage apparatus. Furthermore, if a power storage apparatus breaks down, the apparatus may be easily replaced, which facilitates easy maintenance and repair of a power storage system.

Meanwhile, each component of the power storage system of the present disclosure shown in FIGS. 3 and 4 should be understood as a logically distinguishable component, rather than a physically distinguishable component.

In other words, each component corresponds to a logic component for realizing the spirit of the present disclosure, so each component should be understood as being included in the scope of the present disclosure if it may realize its logic function even if it is implemented separately or integrated with another component. In addition, a component performing a function identical or similar to that of the present disclosure should be understood as being included in the scope of the present disclosure even though it may be titled differently.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A power storage apparatus, comprising:
   a housing made of a durable material and defining an installation space of a plurality of secondary batteries;
   a plurality of secondary batteries accommodated in the housing and connected to each other in series or in parallel;
   a battery management system (BMS) for controlling charge and discharge of the plurality of secondary batteries and monitoring an electric characteristic value thereof;
   a status setting switch for setting a status of the BMS; and
   a group setting switch for setting a BMS group,
   wherein the BMS allocates a value set in the status setting switch as a communication identifier thereof.

2. The power storage apparatus according to claim 1, wherein the status setting switch sets the BMS to have a master status or a slave status.

3. The power storage apparatus according to claim 1, wherein the status setting switch sets the BMS to have a master status or an $n^{th}$ slave status.

4. The power storage apparatus according to claim 1, wherein the status setting switch is a jumper switch or a Dual In-line Package (DIP) switch.

5. The power storage apparatus according to claim 1, wherein the BMS allocates values set in the status setting switch and the group setting switch as communication identifiers thereof.

6. The power storage apparatus according to claim 1, wherein the group setting switch is a jumper switch or a DIP switch.

7. The power storage apparatus according to claim 1, further comprising:
   a power line connection terminal; and
   a communication line connection terminal.

8. A power storage system, comprising a plurality of power storage apparatuses defined in claim 1.

9. The power storage system according to claim 8, further comprising:
   a power inverter connected to one end of a power line connecting the plurality of power storage apparatuses to each other.

10. The power storage system according to claim 8, further comprising:
an external communication line for connecting a power storage apparatus having a BMS, set to have a master BMS status in the power storage system, to an external monitoring apparatus.

11. A method of assembling a power storage system by using a power storage apparatus having a BMS and a status setting switch for setting a status of the BMS, the method comprising:
(a) arranging at least two power storage apparatuses;
(b) setting a status of a BMS included in each power storage apparatus by using a status setting switch included in each corresponding power storage apparatus and allowing the BMS of each power storage apparatus to allocate a value set in the status setting switch as a communication identifier thereof; and
(c) connecting power lines and communication lines of the plurality of power storage apparatuses,
wherein the power storage apparatus further includes a group setting switch for setting a BMS group, and
wherein, in the step (b), each BMS status is set by means of the status setting switch and each BMS group is set by means of the group setting switch.

12. The method of assembling a power storage system according to claim 1, wherein, in the step (b), each BMS is set to have a master status or a slave status by means of the status setting switch.

13. The method of assembling a power storage system according to claim 11, wherein, in the step (b), each BMS is set to have a master status or an $n^{th}$ slave status by means of the status setting switch.

14. The method of assembling a power storage system according to claim 11, wherein the step (b) further includes:
allowing the BMS of each power storage apparatus to allocate values set in the status setting switch and the group setting switch as communication identifiers thereof.

15. The method of assembling a power storage system according to claim 11, wherein the step (c) further includes:
connecting a power inverter to one end of the power line connecting the plurality of power storage apparatuses to each other.

16. The method of assembling a power storage system according to claim 11, wherein the step (c) further includes:
connecting a power storage apparatus having a BMS, set to have a master BMS status in the power storage system, to an external monitoring apparatus through an external communication line.

17. The power storage system according to claim 1, wherein the BMS measures an electric characteristic value of current or voltage of the secondary battery pack, controls charge and discharge, controls voltage equalization, estimates state of charge (SOC), and controls power supply to a load of the secondary battery rack.

18. The method of assembling a power storage system according to claim 11, further comprising:
measuring an electric characteristic value of current or voltage of the secondary battery pack, controlling charge and discharge, controlling voltage equalization, estimating state of charge (SOC), and controlling power supply to a load of the secondary battery rack with the BMS.

19. The power storage system according to claim 1, wherein the group setting switch comprises a plurality of jumper pins and a coupling member connected to a pair of jumper pins,
wherein a position of the coupling member sets a group for the BMS.

20. The method of assembling a power storage system according to claim 11, further comprising:
providing a plurality of jumper pins and a coupling member connected to a pair of jumper pins for the group setting switch; and
setting a group for the BMS by a position of the coupling member.

* * * * *